May 16, 1961 A. MUSSCHOOT 2,984,339
TUNABLE VIBRATORY APPARATUS
Filed July 6, 1959 5 Sheets-Sheet 3
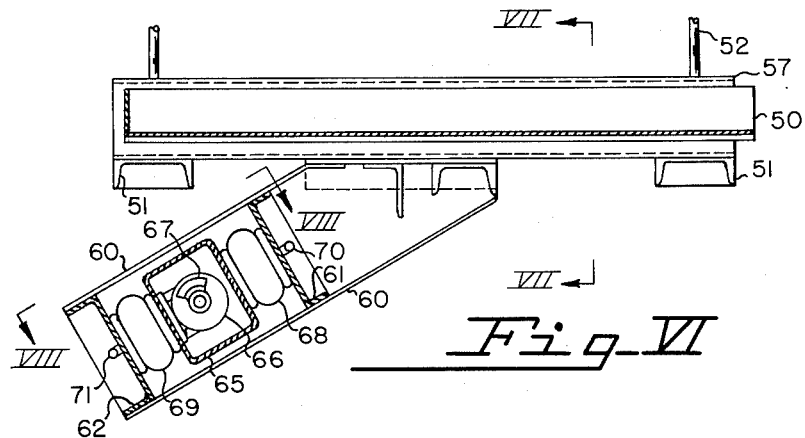
Fig. VI
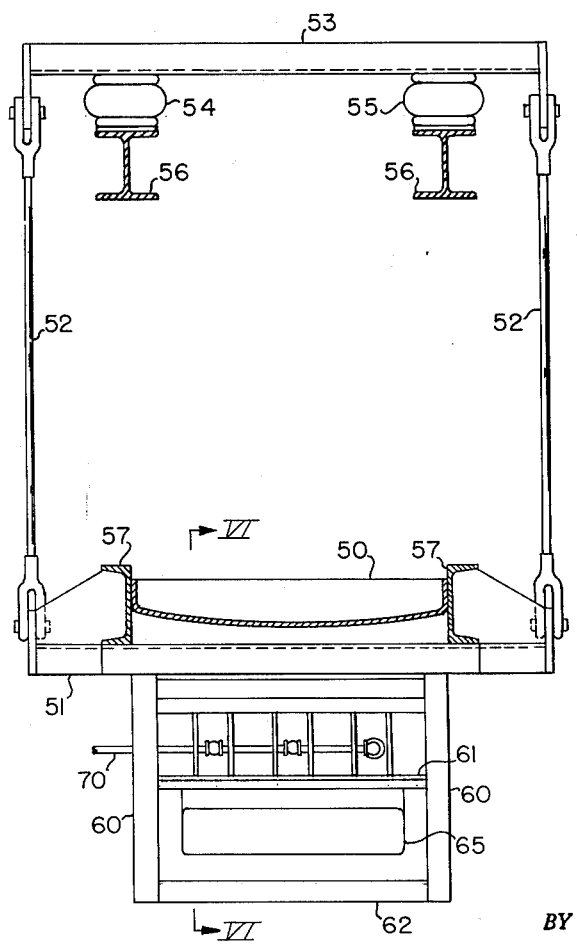
Fig. VII
INVENTOR.
ALBERT MUSSCHOOT
BY
Marshall, Marshall & Yeasting
ATTORNEYS

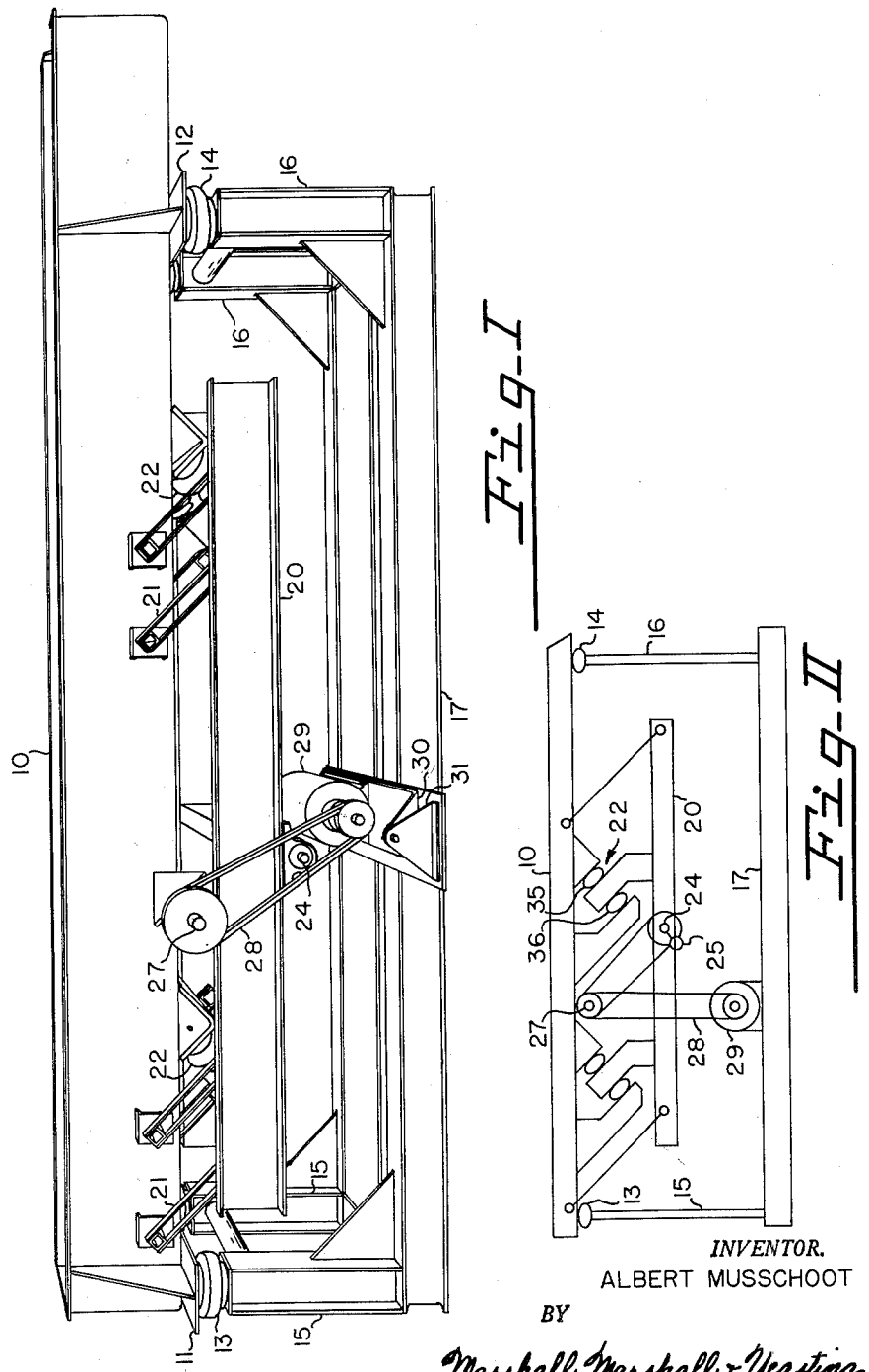

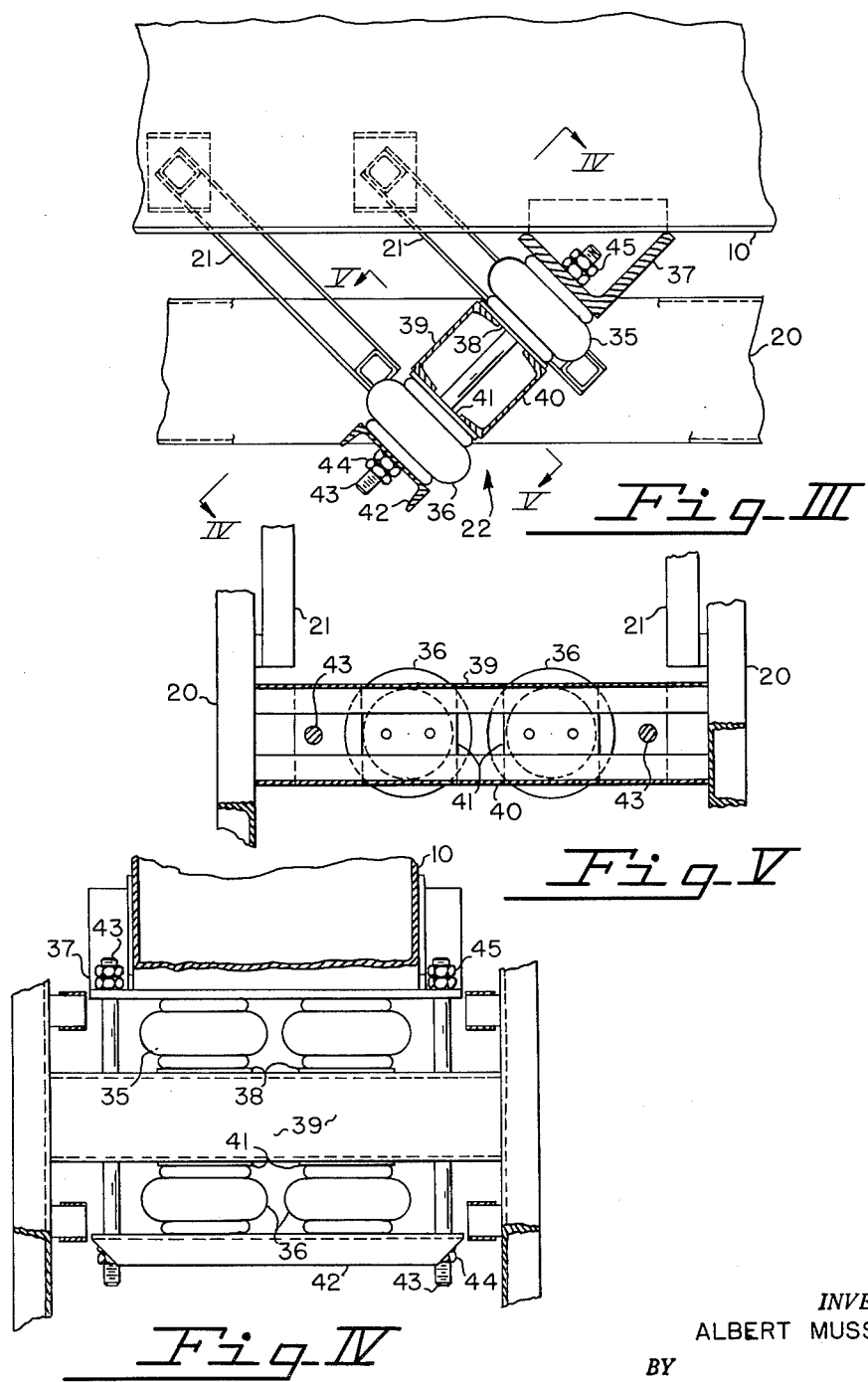

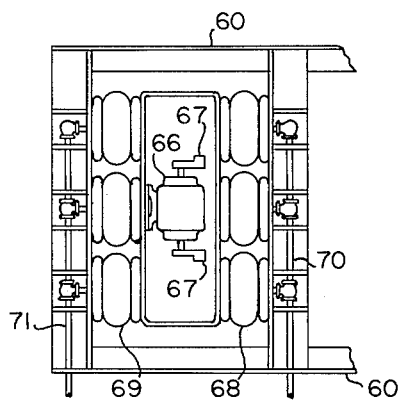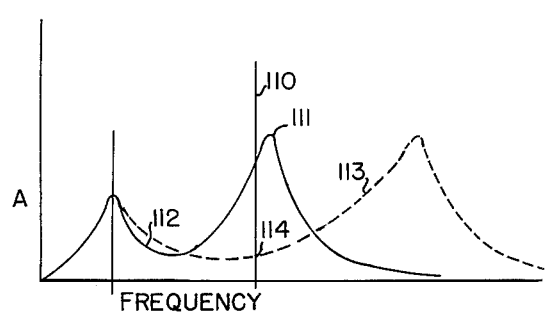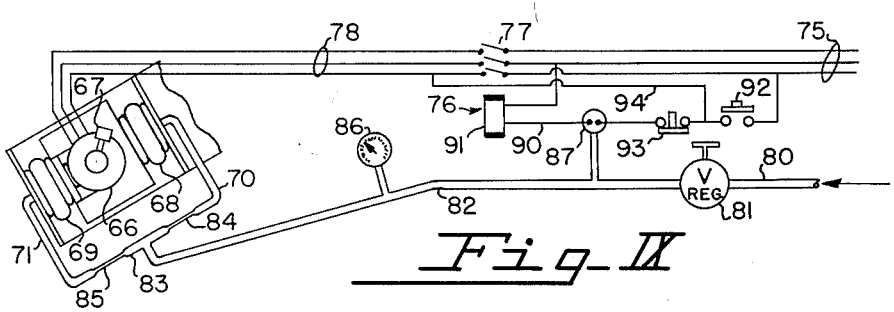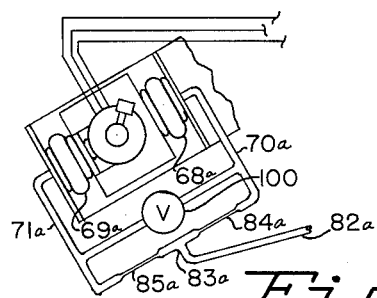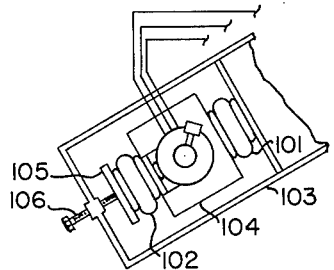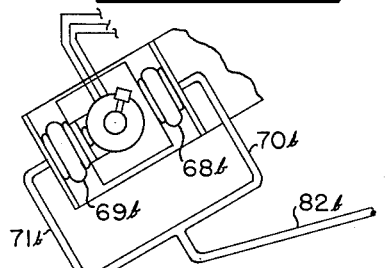

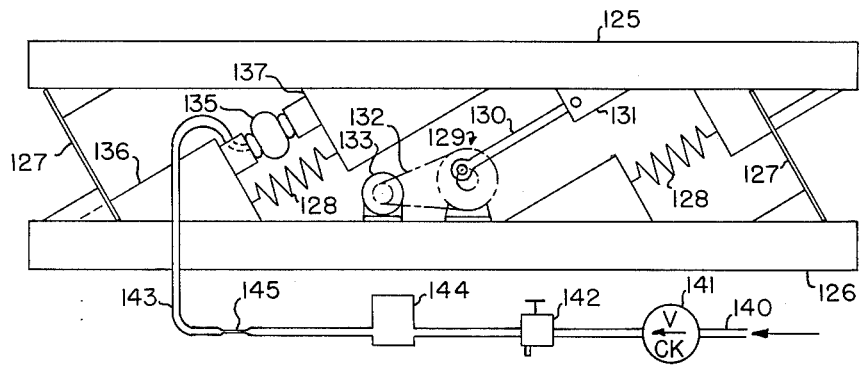
_Fig. XIV_
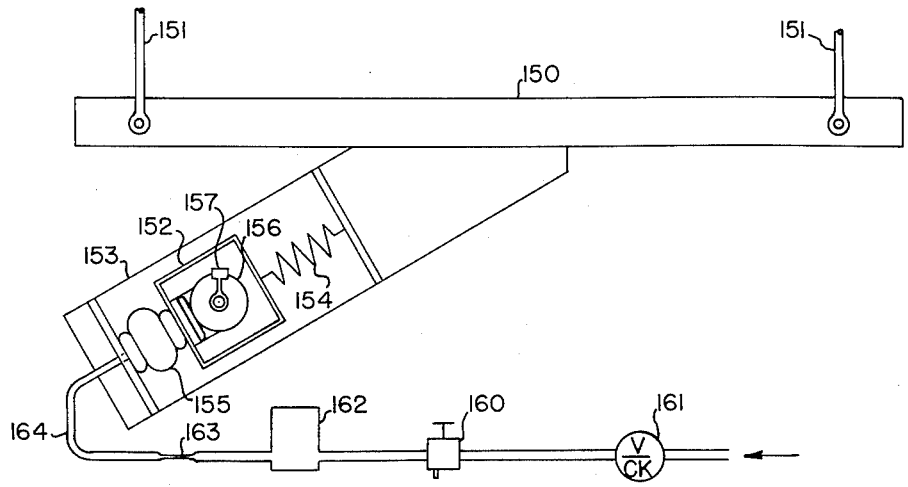
_Fig. XV_

United States Patent Office 2,984,339
Patented May 16, 1961

2,984,339

TUNABLE VIBRATORY APPARATUS

Albert Musschoot, near Louisville, Ky., assignor, by mesne assignments, to Chain Belt Company, Milwaukee, Wis., a corporation of Wisconsin Filed July 6, 1959, Ser. No. 825,272

15 Claims. (Cl. 198—232)

This invention relates to vibratory apparatus employing tuned resonant systems and in particular to such resonant systems in which the tuning is effected by varying the air pressure in air bags serving as resilient elements.

Vibratory work performing apparatus has been used for many purposes including conveying or screening of materials. One of the major problems when using vibratory apparatus for conveying or screening has been the regulation of the conveying or screening speed of the equipment. The speed with which a vibratory conveyor moves material depends upon the frequency of vibration and the amplitude of the vibration. With ordinary eccentric weights and conventional alternating current motors as drive elements the frequency and amplitude of vibration are fixed by the weights and by the motor speed and the sizes of the pulleys used in a belt transmission from the motor to the eccentric weights providing the vibratory force. These weights and speeds cannot be readily varied during operation of the equipment and thus there is no easy method to control the conveying or screening speed of the equipment. When resonant systems are employed to achieve higher efficiency, the conveying or screening speed of the equipment is quite sensitive to changes in speed because of the change in magnification of the resonant system. Some vibratory equipment has been designed with variable pitch pulleys or with variable speed direct current motors so that the speed of the eccentric weights may be varied to change the tuning of the system and thus the amplitude of vibration. These methods of control are relatively expensive and are therefore used only when it is absolutely necessary to have an amplitude control.

The principal object of this invention is to provide a vibratory system having readily adjustable resilient elements the elasticity of which may, while the equipment is in operation, be varied to adjust the tuning of the system and thus control of the conveying or screening speed of the equipment.

A further object of the invention is to provide resonant vibratory apparatus having readily controllable resilient elements suitable for varying the tuning of a vibratory system operating at a fixed frequency.

A still further object of the invention is to provide improved means for controlling the resiliency of the resilient elements in accordance with the required operating conditions.

More specific objects and advantages are apparent from the following description of a preferred form of the invention.

According to the invention, a vibratory work performing system, in which vibrations are produced by eccentric weights rotated at a constant speed, is equipped with a plurality of readily adjustable resilient elements in the form of air bags or air springs the internal pressure of which is regulated to adjust the condition of resonance or tuning of the vibratory system including such air bags. A preferred form of the invention is illustrated in the accompanying drawings.

In the drawings:

Fig. I is a perspective view of a vibratory conveyor constructed according to the invention.

Fig. II is a schematic diagram of the conveyor shown in Fig. I to illustrate the cooperation of the various elements of the conveyor.

Fig. III is an enlarged vertical section of one of the resilient couplings that connect the exciter member of Fig. I to the conveyor itself.

Fig. IV is an enlarged detailed view of the coupling member as seen from the line IV—IV of Fig. III.

Fig. V is a cross sectional view of the coupling member as seen from the line V—V of Fig. III.

Fig. VI is a vertical longitudinal section through another form of conveyor constructed according to the invention.

Fig. VII is a vertical transverse section of the conveyor shown in Fig. VI as seen from the line VII—VII of Fig. VI.

Fig. VIII is a fragmentary view of the vibration exciting mechanism of the conveyor shown in Fig. VI as seen from the line VIII—VIII of Fig. VI.

Fig. IX is a schematic control diagram showing a preferred method of control of the improved vibration exciter.

Figs. X, XI, and XII are schematic diagrams of portions of modified control systems based on the control shown in Fig. IX.

Fig. XIII is a graph indicating the modes of operation under various conditions of adjustment of the control.

Fig. XIV is a schematic diagram of a conventional resonant or natural frequency vibratory conveyor employing as resilient elements ordinary steel or similar solid elastic springs and incorporating an air spring together with its control for tuning the other resilient means.

Fig. XV is a schematic diagram of a tuned vibration exciter employing several varieties of resilient members one of which is an adjustable air spring.

These specific figures and the accompanying description are intended merely to illustrate the invention and not to impose limitations on its scope.

A vibratory conveyor is an example of one type of vibratory apparatus in which it is desirable to be able to readily control the amplitude of vibration. A conveyor subject to such amplitude control is illustrated in the accompanying figures. The conveyor illustrated in Figs. I to V comprises a self-supporting trough 10 which near each end is provided with reinforced outriggers 11, 12 that are supported on cushioning means comprising air bags or air springs 13, 14 which in turn rest on the upper ends of I-beam pillars 15 and 16 erected at the corners of a base 17. The air bags 13 and 14, there being a pair of such bags at each end of the conveyor, are of the type commonly employed in automotive suspension systems. Each air bag consists of a pair of metallic base plates that may be attached to the adjacent structure, the base plates being connected by a flexible non-stretchable impervious sleeve or tube that serves to confine the air or other gas in the air bag and permit the base plates to move toward or from each other in accordance with the applied load and the pressure of the air or other gas in the bag. The air bags 13 and 14 are preferably inflated to carry the conveyor at a height that is from one to two inches above that corresponding to their fully collapsed position. At such height they provide a very low spring rate opposing horizontal motion of the conveyor 10 as well as relatively low spring rates for vertical motion so that the conveyor trough 10 may vibrate in any direction at a substantial amplitude without transmitting disturbing vibratory forces through the air bags 13 and 14 to the base pillars 15 and 16.

A vibration exciter 20, in the form of an elongated frame that is suspended beneath the conveyor 10, is attached to the conveyor 10 by a plurality of guide links or cantilever leaf springs 21 that serve to limit relative motion between the exciter member 20 and the trough 10 to motion along a particular path. A plurality of resilient air spring assemblies 22 that are shown in greater detail in Figs. III, IV and V resiliently oppose relative motion of the exciter and conveyor along such path.

The exciter mass 20 carries a shaft 24 on which are mounted eccentric weights 25 (Fig. II). The shaft 24 is driven by a belt 26 from a counter shaft 27 journaled on the conveyor and driven by a belt 28 from a motor 29. The motor 29 is preferably mounted on a tilting platform 30 that is pivotally connected to a yoke member 31 mounted on the base 17 so that the belt 28 is automatically maintained at proper tension by the weight of the motor. The belt 26 does not appear in Fig. I since it is located on the far side of the conveyor.

The resilient coupling 22 as may be seen in Figs. III, IV and V comprises a plurality of upper air bags or air springs 35 and a plurality of lower air springs 36. The upper air springs 35 are held compressed between the lower surface of an angle iron 37 that is attached to the lower side of the trough 10 and the upper side of bridge plates 38 that span the space between the flanges of a pair of channel irons 39 and 40 that are welded in spaced apart facing relation between the side members of the exciter member 20. The channel irons 39 and 40 are thus part of the structural frame of the exciter 20. The lower plurality of air bags 36 are held compressed between bridge plates 41 that span the space between and rest on the side flanges of the channel irons 39 and 40 and the back of a second channel iron 42 that is held in spaced relation from the angle iron 37 by means of bolts 43 fitted with lock nuts 44 and 45.

In this arrangement the bolts 43 hold the lower channel iron 42 in fixed spatial relation to the angle iron 37 and the air bags or air springs 35 and 36 cooperate to resiliently resist movement of the exciter 20 with respect to the conveyor 10. Since each air spring has an effective area that increases with compression of the spring, movement of the exciter 20 from its intermediate position is opposed even though the air springs 35 and 36 are equally inflated.

In the operation of this equipment the air springs 35 and 36 of the resilient coupling 22 are tuned by inflating them to a pressure that provides a spring rate such that the vibratory system comprising the resiliently supported conveyor 10, the exciter member 20 and the resilient couplings 22 has a resonant frequency approximately, but, preferably not exactly equal to the desired operating speed. After the motor 29 is started and the eccentric weights 25 are operating at full speed, the pressure in the air bags 35 and 36 is adjusted to tune the vibratory system to a frequency approximating the operating speed. Since the amplitude of vibration increases materially as the resonant system is tuned toward the operating frequency, any desired amplitude may be obtained by merely selecting and supplying the proper air pressure to the air bags 35 and 36.

It is practical to operate the system with a low pressure in the air bags so as to locate the resonant frequency of the system below the operating speed. Operation in this manner suffers from the disadvantage that any increase in effective mass of the conveyor 10 with increase in load tends to detune the system thus seriously reducing the amplitude of vibration of the conveyor. When operating in the usual mode, with the operating speed below but near the resonant frequency of the vibratory system, any increase in mass of the conveyor with increase in load tends to bring the resonant frequency nearer the operating speed and thus increase the magnification of movement, thus offsetting the added losses and tending to maintain a substantially constant amplitude of vibration of the system with changes in load.

In this arrangement with maximum air pressure in the air bags 35 and 36 the natural or resonant frequency of the system is so far removed from the operating speed that the amplitude of vibration is insufficient to cause conveying motion of any material on the conveyor. This represents a condition of zero delivery. As the air pressure is reduced the amplitude increases up to the maximum allowable amplitude which provides the maximum delivery rate of the conveyor.

For practical commercial reasons it is desirable, particularly in the smaller sizes, to construct the conveyor and its drive as a self-contained or unitary structure. Such an arrangement is illustrated in Figs. VI, VII, and VIII. In this arrangement a conveyor trough 50 is supported on or attached to transverse channel irons 51 as seen in Fig. VI which may either be directly mounted on air springs from a foundation or may be suspended, as shown, by means of suspension rods 52 pivotally connected to an overhead beam 53 which in turn rests on air springs 54 and 55 supported on building frame members 56. This arrangement provides a very soft resilient mounting for the conveyor 50. Preferably the conveyor trough 50 is reinforced along each side by channel irons 57 that not only support the conveyor itself but also provide structure to which a vibration exciter may be connected.

A vibration exciter for driving the conveyor 50 comprises a pair of side members 60 one of which is shown in Fig. VI. These side members are connected with spaced channel irons 61 and 62 that correspond in function to the angle iron 37 and channel iron 42 shown in Fig. III. The channel irons 61 and 62 are spaced apart and the vibration exciter is mounted therebetween.

The vibration exciter comprises a box-like heavy frame 65 in which is mounted a motor 66 carrying eccentric weights 67, one on each end of its armature shaft. The exciter frame 65 is resiliently supported from the channel irons 61 and 62 by a plurality of upper air bags 68 and lower air bags 69. The air bags act in opposition to each other in forcing the exciter member 65 to the center of the space between the channel irons 61 and 62 and in aid of each other in opposing relative motion from such central position. The aiding effect is due to the fact that as the exciter member 65 is moved in one direction it tends to compress one of the air springs thus increasing its force above the average force at the same time that it allows the other air spring to expand thus decreasing its force. The net force tending to return the exciter member is thus the sum of the two changes in force. The upper air bags 67 are interconnected by piping 70 and the lower air bags are connected by piping 71 through which air may be supplied or extracted to change the average pressure in the air bags.

While not shown in Figs. VI and VII it may be desirable to include the links or cantilever springs extending between the exciter member 65 and the side member 60, corresponding to the cantilever springs 21 shown in Fig. I, in order to guide the exciter member 65 along its path of movement and prevent it from sagging downwardly out of place in the event air pressure is lost from the air bags 68 and 69. As long as the air bags 68 and 69 are inflated to operating pressure, their lateral stability is sufficient to carry the weight of the exciter 65 without serious deformation. In lieu of the cantilever guide spring stops may also be employed to limit the lateral deflection of the exciter member when the air bags are deflated.

A preferred control system for regulating the pressure in the air bags 68 and 69 of Figs. VI, VII and VIII or the air bags 35 and 36 of Figs. I and II is illustrated in Fig. IX. As shown, the complete control system includes a three-phase power line 75 that is connected through motor starter switch 76, including contacts 77, to leads 78 connected to the motor 66. The air supply for the air bags or air springs is taken from a supply line 80 through an adjustable pressure-regulating valve 81 and through air line 82 to a T connection 83 and thence through restricted lines 84 and 85 to the piping 70 and 71 connected to the air bags 68 and 69. A pressure gauge 86 connected to the air line 82 indicates the average pressure to which the air bags are inflated. A pressure operated electrical switch 87 is also connected to the air line 82 and is electrically connected in a lead 90 that feeds an operating coil 91 of the motor starting switch 76.

When the conveyor is to be put into operation, and electrical power is available on the line 75, the motor is started by momentarily closing a start switch 92 so that current can flow from one of the supply leads through the now closed start switch 92, a normally closed stop switch 93, the pressure control switch 87, the lead 90 to the coil 91 and thence back to a second one of the power supply lines 75. If sufficient air pressure is available in the line 82 so that the pressure operated switch is closed this circuit then energizes the motor starting switch coil 91 so that it closes its contacts 77 to start the motor. As soon as the contacts 77 close, power is supplied through lead 94 to the junction between the start switch 92 and stop switch 93 to provide a sealing or holding circuit for the motor starting switch operating coil 91.

The motor is stopped if the stop switch 93 is depressed or if the air pressure in the line 82 drops below the minimum value at which the pressure control switch 87 operates to break the circuit. The pressure switch is installed as a safety measure in this arrangement because the system is normally operated with the resonant frequency of the vibratory system above the operating speed. Thus any reduction in air pressure below a given minimum permits the resonant frequency to coincide with the operating speed so that the system is exactly in resonance, a condition which may produce excessive vibration and damage to the equipment.

This system is adjusted by placing the system in operation then reducing the air pressure by means of the pressure regulating valve 81 until the conveyor is operating at the maximum allowable amplitude of vibration. The pressure switch 87 is then adjusted until it is at the point of opening the circuit to the motor. Under this condition of adjustment the system may be operated at any safe desired amplitude of vibration but should conditions arise that the air pressure tends to fall below the selected minimum the motor is immediately stopped to safeguard the equipment.

The restricted lines 84 and 85 leading from the T 83 to the upper and lower sets of air bags minimize the transmission of cyclic changes in air pressure from the air bags into the line 82 and back to the pressure regulating valve 81. The symmetrical arrangement of the two sets of restricted lines 84 and 85 tends to balance the pressure in the T 83 inasmuch as the dynamic pressure change in one set of air bags is positive while that in the other is negative and if the changes are equal the dynamic pressure changes in the T 83 should be substantially zero. However, this condition does not obtain exactly because the pressure changes in the air bags are not linearly related to the displacement of the exciter member 65 so that actually there is a cyclic pressure change in the T 83 occurring at twice the operating speed. Non-symmetrical conditions in the air bags and the weight of the exciter member 65 tending to further compress the lower air bag 68 result in a small dynamic pressure fluctuation in the T 83 at the operating speed in addition to the double frequency fluctuations.

If the residual pressure fluctuations in the line 82 are sufficient to be a hazard to the safe operation of the pressure gauge 86, the pressure operated switch 87, and the pressure regulator 81 an acoustic type filter system may be incorporated in the air supply line 82 to filter out the dynamic pressure changes without affecting the flow of air to change the quantity of air in the system when inflating or deflating the air bags.

A modified method of control is illustrated in Fig. X. In this arrangement a pressure line 82a which may carry air at a predetermined pressure is connected through restricted passages 84a and 85a to air lines 70a and 71a leading to the air bags to be controlled. In addition a by-pass valve 100 is connected between the air lines 70a and 71a so that as the valve is opened, in a throttling manner, air is allowed to oscillate, at the frequency of operation of the eccentric weights, between the air bags 68a and 69a. This alternating flow of air or gas through the by-pass valve 100 affects the vibratory system in two ways. First, it slightly reduces the effective spring rate of the air springs and second, it introduces a substantial amount of damping into the system.

It is entirely practical with this type of control arrangement to adjust the static air pressure in the line 82a so that, when the valve 100 is closed, the system operates with the resonant frequency of the system slightly higher than the operating speed. As the valve 100 is opened, the additional damping introduced by the circulation of air cancels the resonant increase in amplitude of vibration as the resonant frequency falls because of the decrease in the effective spring rate of the air springs. When the valve 100 is completely opened and there is no compensating change in average pressure the amplitude of vibration of the system is very low because the effective spring rate is then also very low.

This type of control is preferred where changes in amplitude must be made very quickly or at frequent intervals because there is no air lost from the air supply line in making a change in amplitude. This type of control may also be employed in situations where a constant pressure air supply line is not available and the system is merely pumped up to the desired pressure with a pump connected to the line 82a which is then sealed off to trap the air in the system. The amplitude control by varying the valve 100 is thus effective without a continuous supply of air.

The control system illustrated in Fig. XI employs another characteristic of the air springs in order to exercise control. In this arrangement the upper group of air springs 68b are connected directly to the lower group 69b by means of the piping 70b and 71b so that there is relatively free circulation of air from one chamber to the other as the exciter member vibrates. While there is little pressure change in the air bags under this condition, the bags still exhibit a substantial spring rate because of the change in effective area of the air bags with changes in deflection. In order to get a spring rate in the air springs in this method of control comparable to that obtained in the arrangement shown in Fig. IX the pressures to which the air bags are inflated must be much higher to compensate for the fact that there is little or no change in pressure with deflection of the air bags.

A still further method of control is illustrated in Fig. XII. In this method of control which differs radically from those shown in Figs. IX to XI inclusive, pairs of air bags 101 and 102 corresponding to the air bags 68 and 69 are held in a frame 103 corresponding to the members 61, 62 and side plate 60 of Fig. VI. The exciter member 104 is supported on the air springs 101, 102 for vibration relative to the frame 103. This arrangement differs from the preceding arrangements in that a supplementary plate 105 positioned by a screw 106 is employed to compress the air springs 101 and 102 and thus change the pressure at which they operate and the deflection of the springs. In this arrangement the air bags 101, 102 are inflated to a given pressure that provides operation at a resonant frequency slightly higher than the operating speed when the screw 106 is backed out to allow the air bags 101, 102 to operate at maximum deflection and minimum pressure. When it is desired to decrease the amplitude of vibration for control purposes the screw 106 is screwed inwardly to compress the air bags thus increasing their spring rate and raising the natural frequency away from the operating speed to detune the system and thus cause it to operate at a substantially lower amplitude of vibration.

Changing the operating height of the air springs 101 and 102 by means of the screw 106 exercises rapid control on the spring rate of the air springs because compressing the air springs has a double effect of increasing the effective area for a given pressure and increasing the average pressure both effects of which are cumulative in increasing the spring rate. With this type of control, for ease of operation, it is necessary that the screw 106 or equivalent compressing mechanism be relatively efficient because it must operate against the static force of the air springs which is considerably greater than the mass or weight of the exciter member 104.

Fig. XIII illustrates in graphical form the relationship between the operating speed and the resonant frequency of the vibratory system as the pressure in the air springs is varied to change the resonant frequency. In this figure the amplitude of vibration A is plotted as the ordinate against frequency as the abscissa. With a constant speed motor the operating frequency represented by an ordinate 110 remains at a fixed frequency whereas the resonant frequency of the vibratory system represented by the peak 111 of the curve 112 shifts along the frequency axis with changes in tuning of the system. The solid line 112 with the peak 111 located at a slightly higher frequency than the operating speed represents the condition with the minimum allowable air pressure in the air bags which is the condition for maximum working amplitude of vibration when operating below resonance. As the air pressure is increased above that which provides operation along the curve 112 the curve shifts to the right as indicated by the dotted line 113 so that with the maximum pressure applied to the air bags the amplitude of vibration is reduced to a value represented by a point 114 on the curve 113. The amplitude of vibration under this condition is insufficient to provide a conveying action in either a conveyor or a screen and thus represents the zero delivery condition of the conveyor or screen. The system may also be operated above resonance in which case the maximum pressure must be limited to avoid operating exactly at resonance. If the amplitude control of Fig. X is used the system may be operated at resonance if the valve 100 is partially opened.

It may be noted that the lower frequency peak in the curves 112 and 113 does not change in frequency with adjustment of the air pressure because this peak represents the natural period of vibration of the entire system on the resilient supporting springs and there is no change in this natural frequency condition with changes in the air springs 68 and 69 or the air springs 35 and 36.

This method of control of the rate or tuning of the springs of a vibratory mechanism provides a quick and easy method of controlling the amplitude of vibration. Most areas where conveyors are used have a shop supply of air to which the control may be connected to allow use of the control system illustrated in Fig. IX. However, the other control methods are readily adaptable for those situations in which a shop supply of air is not available.

Since the amplitude of vibration of the conveyor is controlled entirely by the air pressure supplied by the regulating valve 81 in the control system shown in Fig. IX, it is clearly apparent that the control may be located either closely adjacent the conveyor or at some remote point, whichever best fits in with the particular installation requirements.

In each of the described arrangements the variable control pressure is applied equally to the several air springs. Generally similar results, smaller in degree, may be obtained by applying the controlled air pressure to one or several but less than all of the springs of a particular unit.

In each of the foregoing systems, air springs were illustrated as the resilient elements. It was suggested that, in these systems, the adjusted air pressure could be applied to one or more of the air springs and preferably was applied to all of the air springs of a vibratory system to get as great a response as possible for a given change in air pressure. When a lesser response is satisfactory, the adjustable air pressure may be applied to less than all of the air springs. If the adjustable air pressure is not applied to an air spring but rather that particular air spring is maintained at a constant air pressure, it may just as well be replaced with a spring of solid resilient material such as a steel spring, a rubber spring, or any other non-adjustable type of spring. Systems constructed accordingly are illustrated in Figs. XIV and XV.

In the structure shown in Fig. XIV a conveyor 125, constituting a vibratory work member, is supported from a base or second member 126 by means that include guide links 127 and springs 128. The guide links 127 or guide members may either be cantilever leaf springs in which case they assist the springs 128 or they may be rigid links pivoted at each end. Vibration of the work member 125 is produced by a crank or eccentric mechanism 129 that is connected through a connecting rod 130 to a bracket 131 attached to the vibratory work member 125. The crank mechanism is driven by a belt 132 from a drive motor 133. The drive motor 133 is preferably but not necessarily a constant speed motor such that the conveyor or vibratory work member 125 is vibrated at a fixed frequency. This frequency may be selected according to the work to be done by varying the size of the pulleys over which the belt 132 runs or by selecting the proper motor speeds.

To minimize the force exerted through the connecting rod 130 it is desirable to tune the vibratory system comprising the work member 125 and springs 128 so that the system operates substantially at its natural or resonant frequency.

Since it is difficult to exactly tune an ordinary vibratory system advantage is taken of the continuously variable spring characteristics of an air spring by mounting an air spring 135 between a bracket 136 erected from the base 126 and an upper bracket 137 attached to the under side of the vibratory work member 125. The air spring 135 is inflated to selected pressures by air supplied from an air pressure supply line 140 through a check valve 141, a self-bleeding pressure regulating valve 142 and an air line 143 connected to the air spring 135. If the cyclic pressure changes in the air spring, resulting from vibration and feed back through the line 143 interfere with the regulator valve 142 a filter comprising an air accumulator 144 and choke or restriction 145 may be installed in the air line 143. Since the spring rate of an air spring, such as the air spring 135, varies with the pressure to which the spring is inflated, this arrangement makes it possible to tune the vibratory system by merely changing the average pressure in the air spring. This pressure is controlled by the pressure regulating valve 142 which is of the self-bleeding variety such that it will maintain a selected pressure in the air spring regardless of whether the air pressure tends to increase or decrease. The check valve 141 is included in the system to ensure that the pressure will be retained in the air spring in the event that the supply of air pressure fails and the pressure drops in the line 140.

While ordinary coil springs are illustrated in Fig. XIV as the principal resilient elements controlling the vibratory motion of the vibratory work member 125 it should be understood that any type of spring may be substituted and the air spring 135 used as a trimming element for tuning the system.

Fig. XV illustrates the same principles applied to a two-mass vibratory system, the ordinary work member and exciter member system, in which a conveyor member or work member 150 is suspended by resilient cables 151 so that it may vibrate in any direction. Vibratory force is applied to the work member 150 by means of an exciter member 152 that is carried in a frame 153 coupled rigidly to the conveyor member 150. The exciter member 152 is free to move in the frame 153 being restrained only by a first coupling spring 154 which is shown as being a steel coil spring although any type of spring may be substituted. This spring is assisted by an air spring 155 also connected between the frame 153 and the exciter member 152. The air spring 155 is adjustable to vary the tuning of the system as may be required in various modes of operation. Vibratory force is generated in the exciter member by means of a motor 156 carrying an eccentric weight 157. Ordinarily, the motor is operated at a constant speed and such speed is selected according to the desired operating frequency of the vibration of the vibratory work member 150.

In this system the pressure of the air or other gas in the air bag 155 is controlled by an adjustable pressure regulator valve 160 that is connected in series with a check valve 161, a pressure accumulator 162 and a fixed line restriction 163 included in the line 164 leading to the air bag 155. As in the case of the system illustrated in Fig. XIV the restriction 163 and accumulator 162 serve as a filter to protect the pressure regulator valve 160 from the cyclic pressure fluctuations occurring in the air bag 155.

In many installations in which the pressure regulating valve 160 is located quite remotely from the vibratory system, the restriction afforded by an ordinary small diameter air pressure line is sufficient to minimize the pressure fluctuations so that the air accumulator 162 and fixed or adjustable restriction 163 may be eliminated.

The arrangements illustrated in Figs. XIV and XV are particularly useful in solving tuning problems of vibratory conveyors already in service. It is a relatively simple matter to arrange the required brackets to receive the air springs and install the relatively simple air pressure controls.

These arrangements thus make it possible to provide all of the advantages of the continuously adjustable air springs in ordinary vibratory conveyors. The only difference is that in the systems as illustrated in Figs. XIV and XV the pressure control must be adjustable over a much wider range because the air spring contributes only a relatively small part of the overall spring effect of the vibratory system.

Various modifications in the details of construction of the various components of the system may be made without losing the advantages of the control of the amplitude of vibration provided by a simple adjustment of air pressure in the vibratory system.

Having described the invention, I claim:

1. In an apparatus for doing work by vibration, in combination, a work member to be vibrated, cushioning means for supporting the work member, an exciter member, resilient means supporting and guiding said exciter member from the work member for vibration along a selected path, said resilient means including at least one air bag connecting said members, said air bag having flexible side walls and an effective area normal to said path that varies with relative displacement of the members along the path, means for applying vibratory force of generally constant magnitude to at least one of said members to produce relative movement along the path, and means for maintaining gas under a selected average pressure in said air bag to control the resonant frequency of the vibration along said path.

2. In an apparatus for doing work by vibration, in combination, a work member to be vibrated, cushioning means for supporting the work member, an exciter member, resilient means supporting and guiding said exciter member from the work member and cooperating with said members to form a vibratory system for relative motion along a selected path, said resilient means including a plurality of gas filled bags connecting said members, each of said bags having flexible side walls and an effective area normal to said path that varies with relative displacement of one member relative to the other, means for applying vibratory force at constant frequency to at least one of the members to produce relative movement of the members along the path, and means for adjusting the pressure of the gas in the gas filled bags and thus the natural frequency of the vibratory system.

3. In an apparatus for doing work by vibration, in combination, a work member to be vibrated along a work path, a plurality of air bags supporting the work member, an exciter member, a plurality of air bags arranged in push pull to connect the exciter member to the work member and to oppose relative movement between the exciter member and the work member along the work path, said exciter member including an electric motor having eccentric weights mounted on its shaft, a pressure regulator connected to the air bags to maintain a selected air pressure therein, and a pressure actuated switch responsive to the air pressure in the bags, said switch being connected in circuit with said electric motor to deenergize the motor when the average pressure deviates from a selected range of pressures.

4. In an apparatus for doing work by vibration, in combination, a work member to be vibrated along a work path, cushioning means supporting the work member, an exciter member, a plurality of air bags arranged in push pull between adjacent portions of the work member and the exciter member for supporting the exciter member from the work member for movement along said work path, said exciter member comprising an electric motor having eccentric weights mounted on its shaft, a restricted air line for supplying air under pressure to the air bags, said air line providing communication between the air bags to equalize the average pressure without allowing substantial cyclic movement of air between the air bags and a pressure regulator connected in the supply portion of said air line to maintain a selected average pressure in said air bags.

5. In an apparatus for doing work by vibration, in combination, a work member to be vibrated along a work path, cushioning means supporting the work member, an exciter member, a plurality of air bags interposed between the exciter member and opposing surfaces of the work member for resiliently opposing motion of the exciter member along the work path, a motor mounted in the exciter member, eccentric weights mounted on the shaft of the motor, an air line connected to the air bags for inflating such air bags to a selected pressure, said air bags including a first set opposing relative motion of the exciter member in a first direction and a second set opposing motion in a return direction, a by-pass line interconnecting said sets of air bags, an adjustable valve connected in said by-pass line for adjustably restricting said line, and a pressure operated switch connected to said air line and to said motor arranged to deenergize the motor when the air pressure deviates from a given range of pressures.

6. In an apparatus for doing work by vibration, in combination, a work member to be vibrated along a work path, cushioning means supporting the work member, an exciter member, a shaft carrying eccentric weights journaled in said member, means for driving said shaft at a substantially constant speed equal to the desired operating frequency, a first set of air bags arranged between opposing surfaces of the members for resiliently opposing relative motion in a first direction along the work path, a second set of air bags arranged between other opposing surfaces of the members for opposing relative motion in a second direction along the work path, guide means interconnecting the members for guiding the exciter member along such work path, restricted piping interconnecting the sets of air bags to provide leakage of air between such sets, and means connected to the piping for maintaining a selected air pressure in said piping and air bags, whereby said system of work member, air bags and exciter member is resonant at a frequency near the operating frequency.

7. In an apparatus for doing work by vibration, in combination, a work member to be vibrated along a work path, cushioning means for supporting the work member, an exciter member, said exciter member comprising a box-like structure, a shaft journaled in the box-like structure, eccentric weights on the shaft, a frame rigidly attached to the work member and encompassing said exciter member, said frame having opposing surfaces that are perpendicular to the work path, a set of air bags interposed between the box-like structure and each of the opposed surfaces of the frame, means connected to the air bags adapted to maintain a selected average pressure therein, said work member and exciter member cooperating with the air bags to form a resonant system having a natural frequency, and means for rotating the shaft and eccentric weights at a speed approximating said natural frequency.

8. In an apparatus for doing work by vibration, in combination, a work member to be vibrated, a second member, resilient means connecting said members for relative movement along a work path and cooperating with the members to form a vibratory system, at least one air bag connected between said members as a resilient element and cooperating with said resilient means, means for applying vibratory force at a selected frequency to said members, and means for adjusting the air pressure in the air bag to tune the vibratory system.

9. In an apparatus for doing work by vibration, in combination, a work member to be vibrated, a second member, resilient means connecting said members to form a vibratory system having a fixed frequency, means for applying a vibratory force to at least one of the members, an air bag connected between said members to aid said resilient means, and means for adjusting the air pressure in said air bag to change the tuning of the vibratory system.

10. In an apparatus for doing work by vibration, in combination, a work member to be vibrated, a second member, resilient means connecting said members to form a vibratory system having a resonant frequency, means for applying a vibratory force to at least one of the members at a frequency slightly higher than said resonant frequency, at least one air bag connected between said members to aid said resilient means, and controllable means arranged to maintain a selected gas pressure in the air bag to tune the vibratory system.

11. In an apparatus for doing work by vibration, in combination, a work member to be vibrated, a second member, solid resilient means connecting said members to form a vibratory system having a resonant frequency, means for applying a vibratory force to at least one of the members at a frequency generally equal to said resonant frequency, an air bag connected as a spring between said members, and means for adjusting the gas pressure in the air bag to effect changes in tuning of the vibratory system.

12. In an apparatus for doing work by vibration, in combination, a work member to be vibrated along a work path, a resilient support for the work member, an exciter member, resilient means including at least one air bag connecting the exciter member to the work member and cooperating with the members to form a vibratory system having a resonant frequency, said exciter member including a rotatable shaft carrying eccentric weights and means for rotating the shaft at a generally constant speed approximately equal to said resonant frequency, and means for maintaining a selected air pressure in the air bag for fixing the resonant frequency of said vibratory system.

13. In an apparatus for doing work by vibration, in combination, a work member to be vibrated along a work path, a resilient support for the work member, an exciter member, resilient means including at least one air bag connecting the exciter member to the work member and cooperating with the members to form a vibratory system having a resonant frequency that varies with the pressure in the air bag, said exciter member including a shaft carrying eccentric weights that is rotatable at a speed generally equal to said resonant frequency, and a pressure regulator connected to the air bag for maintaining a selected pressure therein.

14. In an apparatus for doing work by vibration, in combination, a work member to be vibrated along a work path, a resilient support for the work member, an exciter member, resilient means including at least one air bag connecting the exciter member to the work member for vibration along a work path at a resonant frequency, eccentric weights carried on a shaft journaled in the exciter member for rotation at a speed generally equal to said resonant frequency, and means for inflating the air bag to adjust the resonant frequency of vibration of the exciter member.

15. In an apparatus for doing work by vibration, in combination, a work member to be vibrated, a base, resilient means coupling the work member to the base for resonant vibration along a work path at an operating speed, means for applying vibratory force to the work member at said operating speed, an air spring connected between the work member and the base, and means for varying the inflation of the air spring to tune the vibratory system of work member and resilient means.

References Cited in the file of this patent

UNITED STATES PATENTS

| | | |
|---|---|---|
| 2,700,470 | De Gail | Jan. 25, 1955 |
| 2,845,168 | Smith et al. | July 29, 1958 |